Sept. 9, 1958   B. McCOLLUM   2,851,122
SEISMIC EXPLORATION METHODS, SYSTEMS AND APPARATUS
Filed April 15, 1954   4 Sheets-Sheet 1
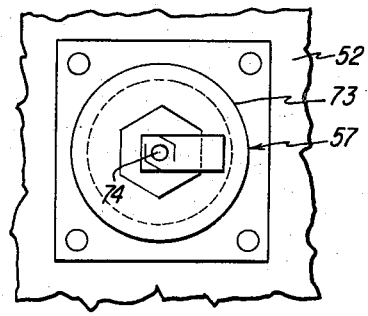
FIG. 3
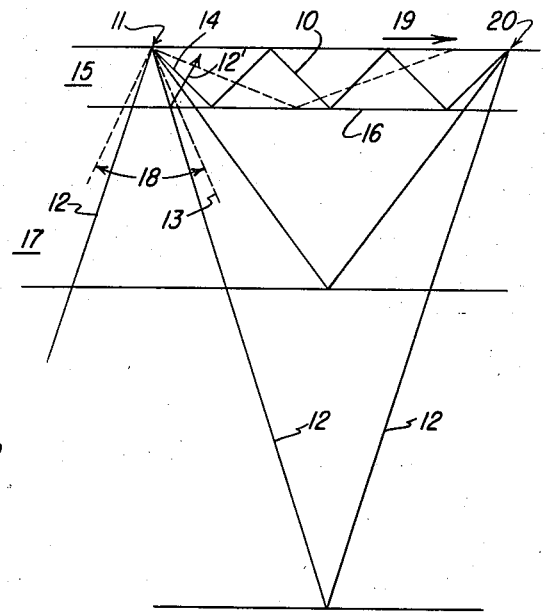
FIG 1
FIG 1
FIG 2
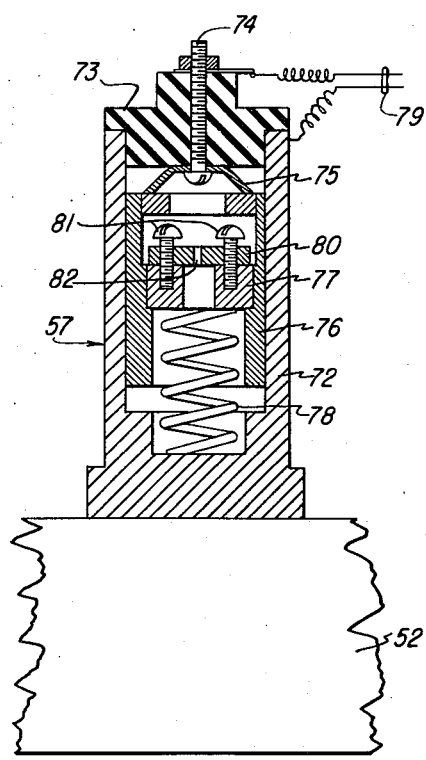
FIG. 4
INVENTOR.
Burton McCollum
BY Frank B Pugsley
Attys.

Sept. 9, 1958  B. McCOLLUM  2,851,122
SEISMIC EXPLORATION METHODS, SYSTEMS AND APPARATUS
Filed April 15, 1954  4 Sheets-Sheet 2

INVENTOR.
Burton McCollum
BY Frank B Pugsley
Attys.

Sept. 9, 1958 B. McCOLLUM 2,851,122
SEISMIC EXPLORATION METHODS, SYSTEMS AND APPARATUS
Filed April 15, 1954 4 Sheets-Sheet 3
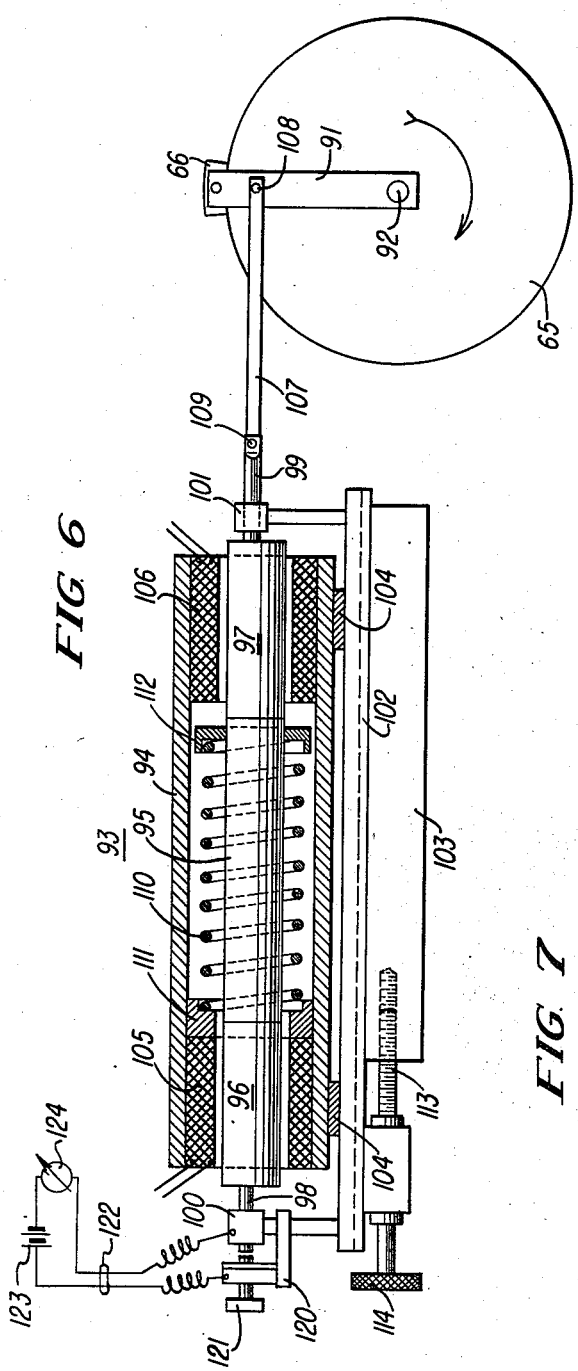
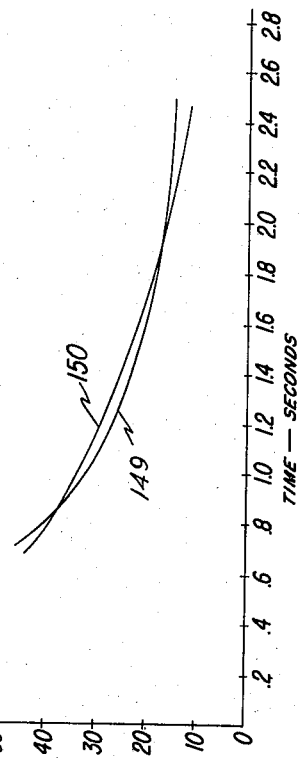
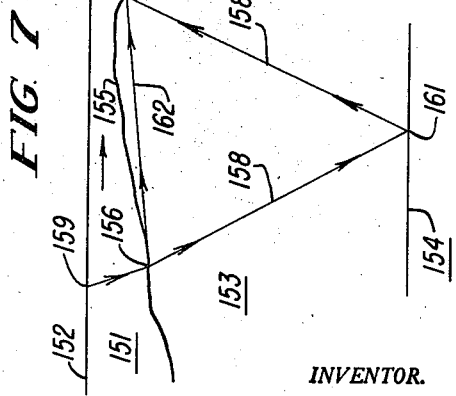
INVENTOR.
Burton McCollum
BY Frank B Pugsley
Attys.

Sept. 9, 1958        B. McCOLLUM        2,851,122
SEISMIC EXPLORATION METHODS, SYSTEMS AND APPARATUS
Filed April 15, 1954        4 Sheets-Sheet 4
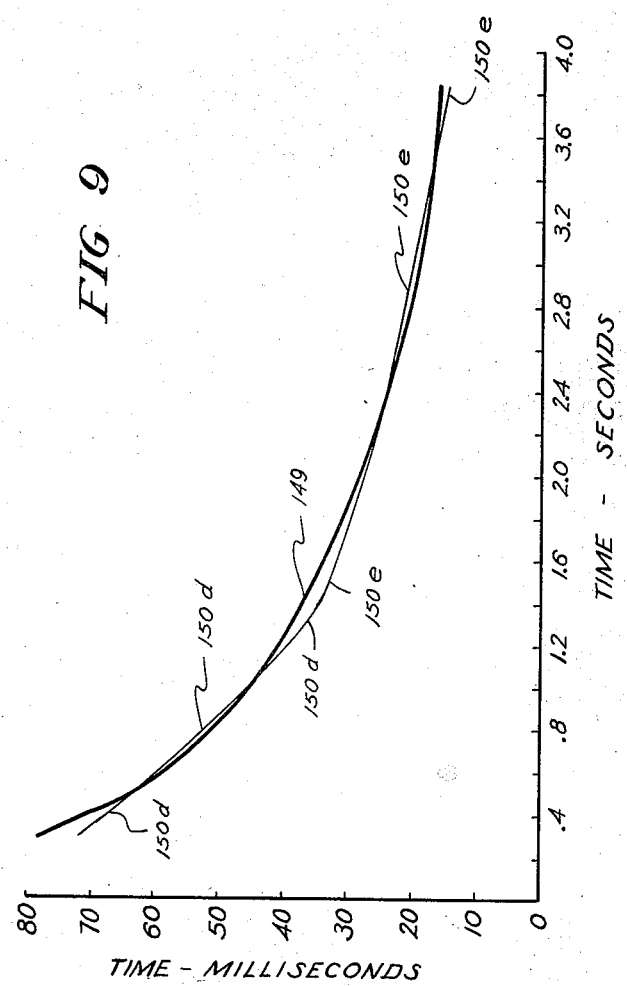
INVENTOR.
Burton McCollum
BY Frank B. Pugsley
ATTORNEY

United States Patent Office

2,851,122
Patented Sept. 9, 1958

2,851,122

SEISMIC EXPLORATION METHODS, SYSTEMS, AND APPARATUS

Burton McCollum, Houston, Tex.

Application April 15, 1954, Serial No. 423,347

18 Claims. (Cl. 181—.5)

The present invention relates to seismic exploration methods, systems and apparatus, and more particularly to improvements in such, as disclosed in the copending application of Burton McCollum, Serial No. 413,297, filed March 1, 1954.

In the above mentioned McCollum application there are disclosed seismic exploration methods, systems and apparatus involving a control or master station, a plurality of spaced field stations and a detector station, wherein a plurality of sequential seismic shocks are produced at respective ones of the field stations, the ensuing sequential seismic waves are detected at the detector station, individual records are produced at the master station from the detected seismic waves, and a composite record is produced from the individual records. In the arrangement, the sequential seismic shocks are produced at the respective field stations by the sequential dropping of a given weight thereat upon the surface of the earth, the weight being carried to the different field stations upon a mobile vehicle, and the weight being dropped in each instance from a fixed height above the earth surface by dropping mechanism carried by the mobile vehicle. Also, in the arrangement, the seismic waves produced by the impacts mentioned contain desirable data characteristic of the depths below the earth surface of the major reflecting horizons, as well as undesirable data characteristic of minor discontinuities of the earth below the surface thereof; whereby, the individual records contain first substantially in-phase components representative of the desirable data mentioned and second substantially out-of-phase components representative of the undesirable data mentioned, so that the first components in the individual records are substantially reinforced in the composite record and the second components in the individual records are substantially attenuated in the composite record.

While this method is quite satisfactory, it is subject to certain minor criticisms concerning small inaccuracies that are introduced thereinto by certain variables encountered in a specific geophysical exploration that must be considered and compensated by the geophysicist in his subsequent interpretation of the corresponding specific composite record.

Accordingly, it is a general object of the present invention to provide in a geophysical exploration method and system of the character described, improved facilities that automatically compensate for the small inaccuracies noted, so that the resulting composite record wave requires no highly specialized interpretation by a skilled geophysicist familiar with the specific geophysical exploration, but rather stands directly as an accurate record of the events produced by well-known and characteristic geological formations, whereby the composite record may be readily and simply interpreted by any person familiar with this art and independent of any particular knowledge of the specific geophysical exploration.

Another object of the invention is to provide in a geophysical exploration method and system of the character described, an improved arrangement for compensating the variable time intervals that are involved in the actual dropping of the weight at the various field stations.

A further object of the invention is to provide in a geophysical method and system of the character described, an arrangement for progressively compensating the different components of the seismic wave resulting from the different reflective horizons disposed at progressively greater depths below the earth surface.

A further object of the invention is to provide in a geophysical exploration method and system of the character described, an arrangement for initially compensating the variations in the character of the relatively shallow weathered layer of the earth adjacent to the surface thereof.

A still further object of the invention is to provide in a geophysical exploration method and system of the character described, an arrangement for introducing desirable time-phase shifts in the components of detected seismic waves prior to recording to correct for differences of elevation.

Further features of the invention pertain to the particular arrangement of the steps of the method and of the elements of the system and the apparatus, whereby the above-outlined and additional operating features thereof are attained.

The invention, both as to its organization and principle of operation, together with further objects and advantages thereof, will best be understood by reference to the following specification taken in connection with the accompanying drawings, in which:

Figure 1 is a diagrammatic illustration of the ray paths of an elastic wave involved in the geophysical exploration in accordance with the method and system of the present invention;

Fig. 2 is a diagrammatic illustration of the pattern of a detector station and a plurality of field stations involved in the geophysical exploration;

Fig. 3 is a plan view of an impact switch incorporated in the system employed in the geophysical exploration;

Fig. 4 is a vertical sectional view of the impact switch shown in Fig. 3;

Fig. 6 is a longitudinal sectional view of an electrodynamic device incorporated in the geophysical exploration system;

Fig. 7 is another diagrammatic illustration of the ray paths of an elastic wave involved in the geophysical exploration; and Figs. 8 and 9 are graphic illustrations of the close correspondency between the theoretical and the actual characteristics of certain elements incorporated in the geophysical exploration system.

Figure 5:
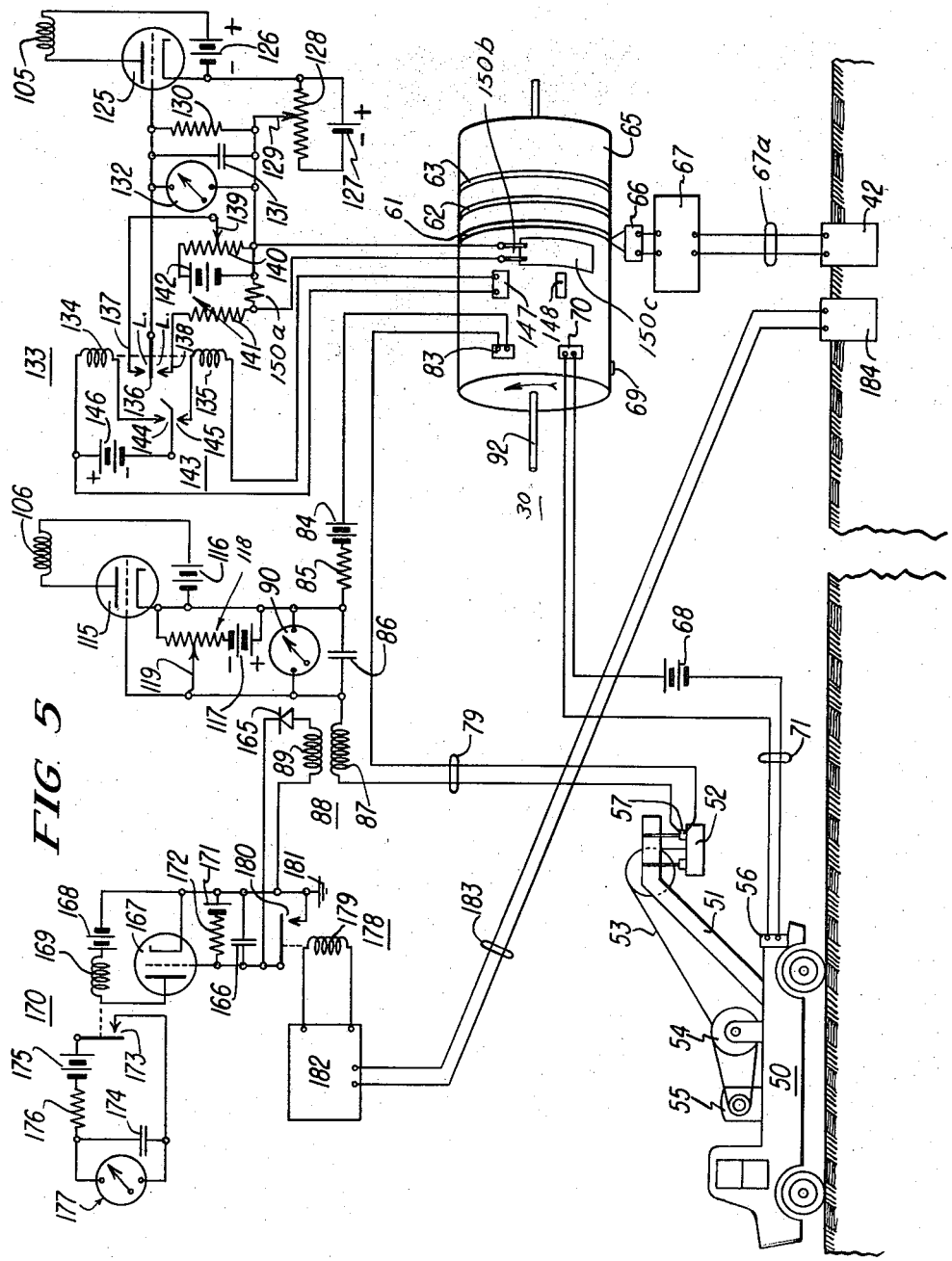
Fig. 5 is a combined physical and electrical diagram of the apparatus incorporated in the geophysical exploration system and embodying the present invention.

In the seismic exploration of subsurface horizons for the purpose of locating oil or minerals, a common method employed is that known as the reflection method. In this method, an elastic wave is generated at a suitable point, usually near the surface of the earth, and this wave radiates in all directions from the source until it encounters discontinuities, such as boundaries between sands, shales, limestones, etc., and at such boundaries a part of the energy of the wave is reflected back toward the surface where it is detected and recorded by well-known apparatus. In this method, the reflected waves that travel more or less vertically are the ones that are of chief interest to the geophysicist. However, as the method is used in practice, the vertically traveling waves are not the only waves detected at the earth surface, since there is usually a large amount of energy radiated in a more or less horizontal direction. One explanation for this phenomenon is illustrated in Fig. 1 of the drawings, wherein a source of elastic waves is placed at a field station 11 adjacent to the earth surface, and the various components of the wave radiate in all directions as symbolized by the ray paths 12, 13, 14 etc. Usually there exists near the surface of the earth a zone 15 in which the velocity of propagation of the waves is substantially less than in the deeper formations. The properties of this near surface zone or layer 15 are usually complex and highly variable, but their effects on seismic exploration records may be clearly understood by examining a simplified condition, as shown in Fig. 1, where a boundary 16 is assumed to be disposed between the shallow zone 15 and the adjacent underlying zone 17. If now the velocity of propagation of the waves in the medium 15 is $V_{15}$ and that in the medium 17 is $V_{17}$, it can be shown that those rays, such as 12 and 13 disposed within a certain angle 18, will pass through the boundary 16 with only a small portion of the energy reflected back toward the earth surface, as indicated at 12'. However, those rays exemplified by 14, which are outside the critical angle 18, upon encountering the boundary 16 will be totally reflected. It is well-known that the critical angle 18 beyond which total reflection occurs is given by the following relation: sine of angle 18 is greater than the ratio $V_{15}/V_{17}$. Usually $V_{15}$ is quite small compared to $V_{17}$, so that most of the energy radiated from the source will be totally reflected at the boundary 16, a fact well-known to geophysicists. These totally reflected rays, upon encountering the surface of the earth will again be totally reflected, as indicated at 10. In consequence of this, most of elastic energy emerging from the source 11 will be permanently confined to the surface layer 15, and will progress radially outwardly therein, as indicated by the arrow 19, at an apparent velocity substantially less than the actual velocity $V_{15}$, which, in turn, is much smaller than the velocity $V_{17}$ in the deeper medium 17. These horizontally progressing waves 14, as well as the reflected rays 12, ultimately arrive at a detector station 20, where they are detected and cause electrical analogues of the elastic waves to be generated therein. In practice, the distance between the source at the field station 11 and the detectors at the detector station 20, as measured in a direct line, will be much less than the distance between the stations by way of the reflected ray path 12, but because of the relatively slow progress of the horizontally progressing waves 14, resulting from both the low velocity in the surface zone 15 and the zig-zag path of these waves, as explained above, the two systems of waves will often arrive at the detector station 20 at about the same time. These horizontally progressing waves 14 are subject to both reflection and refraction at numerous boundaries caused by conditions well-known to geophysicists. Also, these horizontally progressing wave trains 14, and their reflected and refracted components, which are virtually trapped in the surface layer 15, much as sound is trapped in a speaking tube, will continue to reverberate for a period usually longer than required for the vertically traveling wave trains 12 to reach the detector station 20 from any depths below the earth surface in which the geophysicist is interested. Further, these undesirable horizontally progressing waves 14 will often completely obscure the desirable vertically traveling waves 12; and in other cases, where the latter waves are not entirely obscured, the interference between the two systems of waves will produce distortions and phase shifts that render accurate interpretation of the records difficult, or impossible.

Referring now to Fig. 2, there is diagrammatically illustrated the basic plan of the present method of geophysical exploration. The master station 30 (shown in Fig. 5) controls a plurality of field stations 31, 32, 33, etc., and 34, a source of seismic waves 41 being indicated at the field station 41. At a known distance from the field stations is a detector station 42, electrically connected to the master station 30, which may be a single unit or a number of units electrically connected in series or parallel or in series-parallel the function is a single detector unit. The distance between the detector station 42 and the various field stations 31, 32, etc., may vary widely from a minimum of about 100 feet, or less, to a maximum of about 2 miles, or more, and ordinarily such distances will range between about 500 feet and 3000 feet. For the purpose of demonstrating the applicable calculations, it is assumed that the distance between the source of elastic waves 41 and the detector station 42 will range from a maximum of 1500 feet to a minimum of 500 feet. Now if a seismic wave is generated by the source 41 at the field station 31, at a distance of 1500 feet from the detector station 42, and a record is made of the resulting waves arriving at the detector station 42 the record will contain not only the desirable vertically traveling waves, but also all of the undesirable horizontally progressing waves, as described with reference to Fig. 1, and the latter waves may largely or entirely obscure the former waves. As described more fully hereinafter, this record is made on a magnetic medium and stored for future use. If now the source 41 is moved to the field station 32 that is located at a distance of 1450 feet from the detector station 42 or 50 feet closer, and a second record is made, and recorded as before, on a record drum, described more fully hereinafter, the corresponding events in the two records will bear a definite relationship with respect to each other. For the purpose of illustrative calculation, it may be assumed that the wave velocity $V_{17}$, which is the average vertical velocity from the base of the weathered layer 15 to any reflecting boundary under consideration at depth "$h$," 10,000 feet/second. In considering the wave velocity $V_{15}$ in the shallow layer 15, a distinction must be made between the actual velocity and the apparent velocity, or rate of horizontal progression of the waves. Experience teaches that progression rates of 3000 to 5000 feet/second are common, so that a mean value of 4000 feet/second may be assumed. The difference in time of arrival of corresponding events on the two records referred to above will be 50 feet divided by the rate of progression of 4000 feet/second, or 12.5 milliseconds. This applies not only to the waves that progress directly from the source 41 to the detector 42, but also to those waves that are reflected within the shallow zone 15 and reverberate for a considerable time before dying down to an energy level below that of the vertically traveling waves 12 from the deeper horizons.

Considering now the vertically traveling waves, if "$x$" be the direct distance from the source 41 to the detector station 42, and "$h$" be the depth of the reflecting horizon below the earth surface, the total distance "$l$" that the wave travels will be:

(1) $$l = \sqrt{x^2 + 4h^2}$$

and the time of travel "$t$" of the wave will be:

(2) $$t = \frac{\sqrt{x^2 + 4h^2}}{V_{17}}$$

Thus, the difference in the times of travel of the two vertically traveling waves mentioned above will be:

(3) $$\Delta t = \frac{\sqrt{x_1^2 + 4h^2} - \sqrt{x_2^2 4h^2}}{V_{17}}$$

This Equation 3 neglects, for the present, the low velocity weathered layer 15 disposed adjacent to the earth surface, that will be considered more fully hereinafter.

When the values previously mentioned ($x_1 = 1500'$; $x_2 = 1450'$) are substituted into Equation 3, and assuming for this illustration that "$h$" = 8000 feet and $V_{17}$ = 10,000 feet/second, there may be derived a value of $\Delta t$ = 0.44 millisecond. Now assuming that the recording system has a hand phase filter that passes waves of a frequency of about 40 cycles/second, a very common value, they will have a wave length, expressed in terms of time, of 25 milliseconds.

Considering now the time values derived above, for the case of the horizontally progressing waves 14, the time-difference is 12.5 milliseconds, or ½ wave-length; while for the vertically traveling waves 12, the time difference is only 0.44 millisecond, or only 0.017 wave-length. It follows, therefore, that if a composite record wave is made of the two individual record waves above mentioned, the horizontally progressing waves will completely cancel each other, while the vertically traveling waves, being almost in-phase, will be cumulative. While in actual practice such complete cancellation of horizontally progressing waves cannot be realized, this procedure, if carried out as described, will result in a very great reduction of the ratio of the energies of the horizontal and vertical waves, thereby greatly improving the records and rendering the interpretation thereof more accurate.

In accordance with the present method, the procedure described above is repeated at the various field stations 33, etc., so that a large number of individual records are produced and stored, the source 41 being moved sequentially to the field stations 33, etc., and the sequentially produced seismic waves being detected by the detector station 42 and recorded at the master station 30. Subsequently, a single composite record is made of all the individual records, as disclosed in the aforementioned copending application whereby the corresponding desirable vertically traveling events are largely additive, resulting in a substantial build-up of the amplitude of such events in the composite record, while the undesirable horizontally progressing events will, in general, tend to be diminished. There are, however, important limitations to the procedure outlined above, which greatly restrict the effectiveness of the method, and these limitations must be overcome in order to produce an entirely satisfactory technique.

It is evident that the primary requisite for eliminating the above-described horizontally progressing events from the composite record, while at the same time building-up the desired vertically traveling events in the composite record, is the combination of two basic techniques, i. e., an integrating recorder, and a field procedure involving considerable lateral dispersion of the source of seismic waves. While this general combination is disclosed in the McCollum application mentioned, the present method involves additional techniques designed to minimize certain inherent difficulties encountered.

In using the integrating recorder for the present purpose, i. e., the integration of a large number of records taken with the source of seismic waves dispersed over great distances, it is necessary for economic reasons to use a source of seismic waves that can be quickly moved from field station to field station, and that can, at each field station, generate a seismic wave, without material delay and at small cost. This may be accomplished in an entirely satisfactory manner by the use of a falling weight carried by a mobile vehicle.

As best shown in Fig. 5, a mobile vehicle or automobile truck 50 is provided that includes a boom 51 supporting a weight 52, connected by a cable 53 to winding-reeling mechanism 54 driven by an electric motor 55, the winding-reeling mechanism 54 being provided with release mechanism 56, and weight 52 carrying an impact switch 57. The connection and arrangement of the apparatus carried by the truck 50 is disclosed in the previously-mentioned McCollum application, and here it is noted that by appropriate control of the electric motor 55, the mechanism 54 may be governed to wind-up the cable 53 in order to effect lifting of the weight 52, and that by appropriate control of the release mechanism 56, the release of the mechanism 54 may be effected, so that the cable 53 is reeled-out as the weight 52 is dropped, by the action of gravity, upon the earth surface at the field station, the impact producing the required seismic shock so that the corresponding seismic wave ensues therefrom. Of course, it will be appreciated that the truck 50 is readily movable from field station to field station, and is appropriately connected, as described more fully hereinafter, to apparatus disposed at the master station. While the connections from the master station to both the field stations and to the detector stations is illustrated by electrical cables, it will be understood, of course, that the master station could with equal facility control the field stations and the detector stations by radio.

A major problem in the use of the integrating recorder is that of insuring that corresponding events on successive records will arrive at the recording track closely enough in-phase so that efficient integration of a plurality of records may be made, which requires that any phase displacement must be only a small fraction of a wave length, preferably less than ¼ wave-length. In the case of the shorter wave lengths often encountered in seismic exploration, this means that the phase difference between corresponding events in successive records must be no more than a very few milliseconds. However, when using a falling weight for generating the seismic waves, unavoidable variations in the time of generating the seismic waves are often of a magnitude that make efficient integration virtually impossible, unless proper compensation is provided. Variations in the time of the release of the weight, variations in friction in the winding-reeling mechanism, and variations in height-of-fall of the weight resulting from irregularities of terrain, all combine to produce phase shifts that may range up to a full wave length or more, especially in the case of the shorter waves. Accordingly, in the present system, an arrangement, described more fully hereinafter, is provided for compensating this variable.

Another variable results from the dispersal of the source of waves over a large distance or area for the purpose of eliminating the horizontally traveling disturbances. This leads to variations in the travel time of corresponding reflected events from the same horizon; and this variation is different depending on both the spacing between the source and the detectors, and also, for any particular spacing, on the depths of the individual reflecting horizons. Accordingly, in the present system, an arrangement, described more fully hereinafter, is provided for compensating these variables.

A further source of phase variation lies in the existence near the surface of the earth, in nearly all areas, of a weathered layer familiar to geophysicists. This is usually a low velocity layer of both varying thickness and varying velocity that introduces significant variations in the travel time of the reflected waves, and therefore produces phase shifts that often are too large to be neglected. Accordingly, in the present system, an arrangement, described more fully hereinafter, is provided for compensating this variable.

A still further variable is variations in which the surface elevation at the field stations, result in variations of travel time from individual field stations. Accordingly, in the present system, an arrangement, described more fully hereinafter is provided for compensating for this variable.

In using the integrating recorder to make a series of individual records, that may be subsequently integrated to produce a composite record, it is, of course, necessary that the successive seismic waves be generated, in each instance, at substantially the same time with respect to the position of the recording track. In order to accomplish this, as shown in Fig. 5, a plurality of recording channels 61, 62, 63, etc., are provided on a record medium carried by the surface of a rotating cylinder or drum 65, which rotates at constant speed in the direction of rotation indicated, and operatively associated with the drum 65 in a recording device 66, that is operatively connected to a preamplifier 67, that, in turn, is operatively connected, as by cables 67a, to the detector station 42 arranged in cooperating relation with the earth at the master station and responsive to seismic waves arriving thereat. In order that successive records may be produced in substantially the same phase, the equipment used to generate the seismic wave is triggered by the recording drum 65, always at the same point in its revolution. One way of accomplishing this result is by providing a cam 69 on the drum 65 that closes a cooperating switch 70 at a predetermined point in the revolution of the drum 65. The switch 70 is included in the control circuit for the release mechanism 56 along with a battery 68 and a cable 71 extending from the drum 65 at the master station to the release mechanism 56 carried by the truck 50 at the field station. As previously explained, when the switch 70 is closed, the release mechanism 56 is actuated to release the mechanism 54 in order to effect dropping of the weight 52, whereby it falls to the earth producing the required impact and the consequent seismic shock so that the seismic wave ensues. However, the release of the weight 52, always at the same point in the rotation of the drum 65, will not alone suffice to accomplish the desired result, since the seismic wave is generated incident to the impact of the weight 52 upon the surface of the earth, and not simply in response to the time of actuation of the release mechanism 56. Under field conditions, several factors cause variations in the time of actual generation of the seismic wave, even though this drop signal recurs always at the same time. Among other things, the mass and the friction in the winding-reeling mechanism 54 cause variations in the time between the receipt of the drop signal by the release mechanism 56 and the actual release of the weight 52 by the mechanism 54. Another source of variation in the time of generating the seismic wave is the unavoidable variation in the height-of-fall, substantial variations in this factor being caused by irregularities of terrain. Further, even on level ground, as well as elsewhere, the character of the surface layer of the earth will vary greatly from place-to-place. When hard rock lies on or very close to the surface, there is very little yielding, other than the elastic displacements due to the impact of the weight, so that the effective distance through which the weight falls will be substantially identical with the measured distance from the elevated position thereof to the surface of the earth. In other places, there will be a soft inelastic layer of surface material varying in thickness up to several inches or more, a plowed field representing an extreme case of this condition. When the falling weight first starts to compress this material, very little resistance will be encountered, and hence no appreciable impact will be imparted to the earth at the instant of contact. However, as the soft material is compressed, it is quickly compressed to an extent that causes it suddenly to assume a high degree of incompressibility. It is at this point that the effective impact of the weight occurs, and the seismic wave is generated. Since the weight has with a normal height of fall, a terminal velocity of about 25 feet/second, the compression of this inelastic layer results in the impact being developed later than would have been the case if no soft inelastic layer existed. Experience shows that the aforementioned causes of variation in impact time are so frequently encountered and are of such magnitude that it is the rule, rather than the exception, that successive records will be so far out-of-phase that efficient integration of corresponding events is impossible. It follows that in order to make the falling weight of the present method a practical workable technique, it is necessary, when each record is being made, to evaluate the above-mentioned variables and to eliminate their effects from the records. In the present system, monitoring and controls are provided that detect and measure the time variations that occur from any and all causes, between the sending-out of the weight release signal and the actual generation of the seismic wave. Also, the system automatically brings into operation compensating factors that result in causing all corresponding events of the successive records to be in very close phase-coincidence so that effective integration may be made, regardless of the cause or extent of the individual variations that may occur at the time of generation of the seismic wave.

More particularly, the system comprises: (1) impact detecting facility that determines the exact time of generation of the seismic wave and that cooperates in evaluating and correcting for all variations from the norm; (2) metering facility that measures the deviation from the norm of the elapsed time between the weight release signal and the actual generation of the seismic wave; and (3) correcting facility that shifts the phase of all incoming seismic events by an amount sufficient to correct for the deviation at the time of generating the seismic wave after the operation of the weight release signal, thereby rendering virtually perfect integration of successive records.

More specifically, as shown in Figs. 3 and 4, the top of the weight 52 carries the impact switch 57 that includes a substantially cylindrical casing 72, preferably formed of metal. The top of the casing 72 is closed by an insulating cap 73 carrying a terminal 74 projecting therethrough, the lower end of the terminal 74 carrying a contact member 75. An inertia weight 76 is slidably mounted within the cylindrical barrel or casing 72, and carries a ring 77, a compression coil spring 78 being arranged within the casing 72 and extending between the bottom thereof and the lower surface of the ring 77. The coil spring 78 normally holds the top end of the inertia weight 76 in firm engagement with the spring contact 75, thereby normally establishing a circuit between the terminal 74 and the casing 72, via the conductors of a cable 79 extending back to the master station. A check valve arrangement is incorporated in the impact switch 57; and more particularly, a valve plate 80 is mounted upon the top of the ring 77 and capable of movement with respect thereto upon a pair of cooperating guide posts 81, the center of the valve plate 80 having a restricted orifice 82 formed therethrough, and the space inside of the casing 72 contains a charge of oil, or other damping liquid, not shown, largely filling the same.

Considering now the operation of the impact switch 57, it will be appreciated that when the weight 52 is dropped by actuation of the release mechanism 56, the weight 52 and the impact switch 57 will be accelerated by gravity, and ultimately the weight 52 will strike the earth with a considerable impact. At this time, the downward movement of the weight 52 and the casing 72 of the impact switch 57 are abruptly arrested; however, the inertia weight 76 continues to move downwardly due to the kinetic energy stored therein, effecting compression of the coil spring 78 and the consequent movement of the valve plate 80 off of its seat upon the ring 77 so that a considerable portion of the oil contained in the lower portion of the casing 72 is moved through the communicating hole in the ring 77, thence around the valve plate 80 into the upper portion of the casing 72 above the valve plate. Of course, this relative downwardly movement of the inertia weight 76 effects disengagement thereof with the contact spring 75 and the consequent interruption of the electrical circuit between the conductors in the cable 79. As the coil spring 78 is compressed, the inertia weight 76 ultimately comes to rest, and subsequently, the coil spring 78 moves the inertia weight 76 back upwardly so that the valve plate 80 is again seated upon the ring 77 causing the oil to flow at a controlled rate through the orifice 82 to produce a dashpot action; whereby the inertia weight 76, after a predetermined additional time interval, is returned into its normal position, so that the contact spring 75 is re-engaged by the inertia weight 76 to recomplete the electrical circuit between the conductors in the cable 79. Accordingly, incident to the impact of the weight 52 upon the earth, the impact switch 57 is quickly operated into its open position and is not returned back into its closed position for a considerable time interval, due to the dashpot action mentioned. The delay in the reclosure of the impact switch 57 should be in excess of about 1/10 second, but not more than three or four seconds. In the arrangement, the rigidity of the coil spring 78 and the mass of the inertia weight 76 should be correlated, as it is not desired that the impact switch 57 be operated into its open position until a direct impact by the weight 52 upon the earth is effected, the impact switch 57 being unresponsive to the mere dropping of the weight 52 upon a small bush, shrub, mat or grass or other vegetation, or on the surface layer of soft earth, as in a plowed field. Accordingly, in the arrangement, the impact switch 57 is operated into its open position only at the instant that the weight 52 makes a firm impact on solid earth capable of generating the seismic wave previously explained.

Referring again to Fig. 5, the cable 79 extends from the impact switch 57 carried by the weight 52 at the truck 50 at the field station back to the drum 65 at the master station, and is included in a circuit with a switch 83, that is also operated by the same cam 69 carried by the drum 65 that operates the switch 70 previously described. More particularly, the switches 70 and 83 are arranged in a predetermined arcuate relation so that the cam 69 carried by the drum 65 closes and then opens the switch 70, and thereafter closes and then opens the switch 83. The circuit mentioned further includes a battery 84, a resistor 85, a capacitor 86 and the primary winding 87 of a transformer 88, the transformer 88 including a secondary winding 89 that is employed for a purpose more fully explained hereinafter. The circuit elements 57, 79, 83, 84, 85, 86 and 87 are arranged in series circuit relation; and further the capacitor 86 is bridged by a voltmeter 90 that is preferably of the electronic type.

When the rotating drum 65 reaches a predetermined point in its revolution, it closes the switch 83 so that the capacitor 86 is charged from the battery 84 via the resistor 85, the switch 83 being closed by the cam 69 about 20 or 30 milliseconds before the seismic wave is generated by the weight 52 striking the earth, in what may be called a normal fall; that is, when none of the numerous causes of deviation in drop-time, previously discussed, are involved. Experience teaches that 25 milliseconds is satisfactory. Now when the weight 52 has been dropped as a consequence of operation of the release mechanism 56 incident to closure of the switch 70, a short time later and just before the weight strikes the earth in a normal fall, the cam 69 closes the switch 83 effecting charging of the capacitor 86, since the impact switch 57 occupies its closed position at this time. The rate at which the capacitor 86 is charged is dependent fundamentally upon the voltage of the battery 84 and the resistance of the resistor 85; and if the resistance of the resistor 85 is sufficiently large, the charge voltage across the capacitor 86 will be small compared to the voltage of the battery 84, so that the rate of accumulation of charge on the capacitor 86 will, for all practical purposes, be constant; whereby the rate of rise of the voltage across the capacitor 86, as indicated by the voltmeter 90, will be substantially constant. Hence, the reading of the voltmeter 90 will, at any instant, afford a measure of the time that has elapsed since the closing of the switch 83 by the cam 69. In the arrangement, the cam 69 retains the switch 83 closed for a brief period, about 50 milliseconds, and the voltmeter 90 is calibrated to ready directly in milliseconds, preferably 50 milliseconds, for full scale. Accordingly, the voltmeter 90 comprises a timing meter.

Now in the arrangement, if the weight drop switch 70 is permanently adjusted so that the cam 69 closes it to drop the weight 52 at such time that the weight 52 will strike the earth in the case of a normal drop at a time within the middle of the 50 millisecond period, covered by the timing meter 90, the impact switch 57 will open the circuit in which the capacitor 86 is being charged, about 25 milliseconds after charging thereof is initiated. Since opening the impact switch 57 arrests the charging of the capacitor 86, the timing meter 90 will read about 25 milliseconds, and will stand at that point until the capacitor 86 is subsequently discharged. This cycle will be repeated whenever conditions are such as to give a normal drop; i. e., when none of the variable factors previously discussed is effective to cause a variation from normal in the time of impact of the weight 52 upon the earth. If, however, for any reason, the weight 52 is either delayed or advanced in striking the earth by, for example, 10 milliseconds, the timing meter 90 will read 10 milliseconds higher or lower, with respect to the normal reading of 25 milliseconds, as the case may be. Consequently, by simply inspecting the timing meter 90, the operator can tell how much, and in what direction, the time of impact of the weight 52 with the earth has deviated from normal. If these time deviations are too large to permit efficient integration of successive records, the operator should discard and erase such record and again drop the weight at the particular field station involved. However, in practice, it is found that certain terrain and other conditions will vary so much from place to place that a large percentage of the records will have to be discarded, and this greatly retards the progress of the work and increases the costs thereof. In order to avoid these difficulties, the system involves using this timing device 90 in combination with a phase shifting device so that whenever there is a deviation of the impact time from the normal, the voltage that is built-up on the capacitor 86, is not only measured by the time meter 90 in amount and in direction as a time deviation, but this voltage automatically brings into play a phase shift of all of the elements on the record so as to cause them to be recorded at the same time they would have been recorded if there had been no deviation in impact time from normal.

Referring now more particularly to Figs. 5 and 6, the record medium that is carried upon the surface of the drum 65 and provided with the channels 61, 62, 63, etc., constitutes a paramagnetic medium, and the recording device 66 constitutes a magnetic recording head. Moreover, the recording head 66 is mounted for relative movement with respect to the surface of the drum 65 so as to accommodate shifting of the time-phase relation therebetween. Specifically, the recording head 66 is carried upon the outer end of an arm 91, the inner end of the arm 91 being pivotally mounted upon the shaft 92 comprising the axis of rotation of the drum 65; and, of course, the recording head 66 cooperates with the associated record medium carried by the surface of the drum 65. For the purpose of adjusting the angular position of the arm 91, an electrodynamic device 93 which is essentially a positioning motor is provided that includes an elongated substantially hollow field element 94 formed of highly permeable magnetic material, in which there are arranged a permanent bar magnet 95 carrying two soft iron armatures 96 and 97 at the opposite ends thereof, the permanent magnet 95 and the armatures 96 and 97 being movable longitudinally as a unit within the cylindrical field element 95. The outer ends of the armatures 96 and 97 carry rods 98 and 99 that are respectively slidably supported in bearings 100 and 101, that are, in turn, carried by a base 102, the base 102 being slidably mounted upon an exterior fixed support 103. Also, the cylindrical field element 94 is suitably supported by blocks 104 upon the base 102 so that the device 93, as a whole, may be moved or adjusted longitudinally. In the cylindrical gap between the armature 96 and the adjacent end of the field element 94, an associated winding 105 is provided; and in the cylindrical gap between the armature 97 and the adjacent end of the field element 94, an associated winding 106 is provided. The outer end of the rod 99 is operatively connected to the arm 91 by an interposed link 107, the outer end of the link 107 being pivotally connected to the arm 91, as indicated at 108, and the inner end of the link 107 being pivotally connected to the outer end of the rod 99, as indicated at 109.

A spring 110 is arranged in surrounding relationship with respect to the permanent magnet 95, one end of the spring 110 being affixed to a nonmagnetic ring 111 secured in place within the cylindrical field element 94, and the other end of the spring 110 being affixed to a nonmagnetic ring 112 secured in place to the permanent magnet 95, the spring 110 being of the tension type for purpose of illustration. The position of the base 102 with respect to the support 103 may be selectively adjusted by a cooperating screw 113, the outer end of the screw 113 carrying a rotatable adjusting knob 114.

Thus, it will be understood that the position of the device 93, as a whole, may be adjusted with respect to the support 103 by proper manipulation of the knob 114, thereby effecting a corresponding angular adjustment of the recording head 66 with respect to the drum 65 through the linkage mechanism including the link 107. In practice, the most extreme angular adjustment of the recording head 66 that will be required is not more than about 5°. Now, if an electric current is conducted through either of the windings 105 or 106, it is evident that the magnetic field of the permanent magnet 95 will be upset or disturbed so that the permanent magnet 95 and the connected armatures 96 and 97 will move, as a unit, in one direction or the other depending upon the polarity of the electric current traversing the winding 105 or 106. Under ordinary conditions, the permanent magnet 95 is strongly magnetized and the normal currents in the windings 105 and 106 are very small. Of course, the movements of the permanent magnet 95, together with the armatures 96 and 97, bring about adjustments of the angular position of the recording head 66 with respect to the drum 65 in the manner previously noted. The movement of the armatures 96 and 97, and consequently of the recording head 66, are substantially linear functions of the currents in either or both of the windings 105 and 106.

At this point, it is noted that the position of the recording head 66 is subject to three separate and independent controls: (1) the adjustment of the screw 113; (2) the direction and magnitude of the current in the winding 105; (3) the direction and magnitude of the current in the winding 106. Thus, these controls being independent may be accumulative or differential, as required, and being substantially linear functions, these controls affect each other, only by superposition, without changing the character of the individual controls.

Again referring to Fig. 5, an electron discharge device 115 of the triode vacuum tube amplifier type is provided that includes an anode, a cathode and a control grid; the winding 106 of the electromagnet 93 and a battery source of plate current supply 116 are connected in series relation between the anode and the cathode of the tube 115; and the cathode and the control grid of the tube 115 are connected across the capacitor 86 and the voltmeter 90 in parallel relationship. Also a control grid biasing circuit is provided that includes a battery source of bias 117 and an associated voltage divider 118 connected in series relation to the cathode of the tube 115. The voltage divider 118 includes an adjustable wiper 119 that is directly connected to the control grid of the tube 115. Accordingly, the tube 115 is normally negatively biased and is operated within a range in which the plate current is substantially a linear function of the grid bias. In the arrangement, the winding 106 is polarized so that with an increase in the plate current of the tube 115, the armature 96 of the device 93 is moved causing the recording head 66 to be advanced with respect to the cooperating record medium, or rotated in the clockwise direction, the direction of rotation of the drum 65, as illustrated in Fig. 6.

Again referring to Fig. 6, the bearing 100 supporting the rod 98 carries an insulating bracket 120 that supports an adjustable thumb screw 121 arranged in cooperating relation with the outer end of the rod 98. An electric circuit is arranged between the rod 98 and the thumb screw 121 that includes a line 122, a battery source of current supply 123 and a voltmeter 124. Now if the wiper 119 of the voltage divider 118 is appropriately adjusted to vary the negative bias applied to the control grid of the tube 115, the plate current of the tube 115 may be adjusted to a value near the lower end of the linear operating range of the tube 115, so that the armature 97 is moved to a position that may be called the "zero" position. At this time, the thumb screw 121 is adjusted just so as to interrupt the contact with the outer end of the rod 98 in order that the voltmeter 124 may read "0." The thumb screw 121 may be locked in this zero position by a suitable locknut arrangement, not shown; and thereafter the voltmeter 124 constitutes an indicator for the position of the armature 97 with respect to its zero position.

Considering now the operation of the apparatus shown in Figs. 5 and 6 for the purpose of compensating variations in impact time of the falling weight 52, it was previously explained that the voltage build-up on the capacitor 86 affords a measure of the variation in the impact time. Now this voltage is impressed to reduce the normal bias applied to the control grid of the tube 115, whereby the plate current of the tube 115 is increased so that the force exerted by the winding 106 upon the armature 97 of the device 93, being proportional to the plate current of the tube 115, is accordingly increased in proportion to the impact time. Hence, by proper design with respect to the strength of the magnetic field in the space occupied by the winding 106, the number of turns of the winding 106, and the rigidity of the spring 110, the movement of the recording head 66, as expressed in time-displacement, may be made to be exactly equal to the deviation in impact time from the normal impact time of the weight 52, for which it is desired to compensate. Thus, in the case of a particular drop, if the impact of the weight 52 with the earth be delayed by 10 milliseconds, for example, then the recording head 66 will be advanced in the clockwise direction, as viewed in Fig. 6, by a small angle corresponding to 10 milliseconds of the associated record medium, and the corresponding seismic wave will be so recorded in this position of the recording head 66. After making this record, the armature 97 is restored to its normal position by the leakage of the charge from the capacitor 86 through the upper portion of the voltage divider 118, as shown in Fig. 5, this condition being monitored by the collapse of the voltage on the capacitor 86, as read by the voltmeter 90 in Fig. 5, and by the reading of the voltmeter 124 in Fig. 6. In the production of the last-mentioned individual record, the angular position thereof upon the record medium carried by the drum 65 is exactly the same as it would have been had there been no deviation in the impact time from the normal impact time. Accordingly, any number of records taken in sequence with widely varying impact times will ultimately integrate with the same efficiency as if the impact times involved were entirely free from the individual variations described. It will be understood that if the recording head 66 is used for playback it will be in the zero position. It is preferable, however, to use a special playback head which may be located at any desired fixed position of the recording drum.

In conjunction with Fig. 2, it has been previously pointed out that in order to eliminate the troublesome horizontally progressing reverberations, it is necesary to make a composite record of a large number of individual records, while dispersing the source 41 over large distances or areas (at the different field stations 31, 32, 33, etc.) in order to increase the intensity of the useful vertically traveling waves and to suppress the horizontally traveling waves. However, in order to accomplish this objective to the extent desired, it is necessary to vary the distance between the source 41 and the detector 42 to so great an extent that even the vertically traveling waves will not integrate effectively. As previously explained in conjunction with Fig. 2, if the displacement of the source 41 between succesive field stations 31, 32, etc., be sufficient to give the most effective suppression of the horizontally traveling waves, it will be found that the length of the ray paths will differ so much that the integration of the vertically traveling waves will not be satisfactory; and it will be recalled that the calculations hereinbefore made involved distances between the source 41 and the detector 42 that were relatively small, and the reflecting horizon was assumed to be relatively deep. These calculations represent a favorable combination, and under the assumptions made, it was found that the vertically traveling waves would integrate efficiently throughout the entire spread assumed. In practice, it is usually found advantageous to employ a larger spacing between the source 41 and the detector station 42 than that assumed above, and it is also important to integrate reflecting events from much shallower horizons than assumed above.

Now when this is examined further, it will be found that serious difficulties of integration will frequently be encountered, and to illustrate the magnitude of these difficulties some additional calculations are made assuming variations in drop distances and in depth of reflecting horizons that are consistent with actual field experience. In these additional calculations, it is again assumed that the velocity $V_{17}$ is 10,000 feet/second and that the drop distance varies from a maximum of 2500 feet to a minimum of 0 feet. Employing the Equation 3 above for $\Delta t$, in which $x_2=0$, calculations have been made, and the values of $\Delta t$ have been tabulated for a number of different reflecting horizons at different depths below the earth surface throughout the range in which the geophysicist is normally interested. In this tabulation, the reflecting horizons are assumed within the range 3500 feet to 12,000 feet below the earth surface, and the drop distances between the source 41 and the detector station 42 are assumed within the range 2500 feet to 0 feet. The results of these calculations are as follows:

| Depth (ft.) of Reflecting Horizons Below Earth Surface | $\Delta t$ (milliseconds) at Different Drop Distances (ft.) Between the Source 41 and the Detector Station 42 | | | | |
|---|---|---|---|---|---|
| | 2,500' | 2,000' | 1,500' | 1,000' | 0' |
| 3,500 | 43.3 | 28.0 | 15.9 | 7.1 | 0 |
| 4,000 | 38.0 | 24.6 | 13.9 | 6.2 | 0 |
| 5,000 | 30.8 | 19.8 | 11.1 | 5.0 | 0 |
| 6,000 | 25.8 | 16.5 | 9.3 | 4.1 | 0 |
| 7,000 | 22.1 | 14.2 | 8.0 | 3.5 | 0 |
| 8,000 | 19.4 | 12.4 | 7.0 | 3.1 | 0 |
| 9,000 | 17.3 | 11.1 | 6.2 | 2.8 | 0 |
| 10,000 | 15.5 | 10.0 | 5.6 | 2.5 | 0 |
| 11,000 | 14.2 | 9.1 | 5.1 | 2.3 | 0 |
| 12,000 | 12.9 | 8.3 | 4.6 | 2.1 | 0 |

An inspection of this tabulation shows that with the spreads assumed the reflected events from the longer drop distances are more widely displaced with respect to each other than are those from the shorter drop distances, and that the differences are so great that integration of successive records over any substantial part of the range would not be possible. For the shallower horizons, the displacements are as much as two or more wave lengths; whereas, to achieve efficient integration the displacement should not be more than about ¼ wave-length, which in practice requires that the phase shift be not more than 5 to 7 milliseconds depending upon the wave length.

In order to accomplish efficient integration, compensation must be provided for these time displacements. For example, from the table, it will be observed that when the drop distance between the source 41 and the detector station 42 is 2500 feet, the reflected event from the 3500 feet horizon arrives 43.3 milliseconds later than it would have, if the drop distance between the source 41 and the detector station 42 had been zero. Similarly, when the drop distance between the source 41 and the detector station 42 is 2000 feet, the reflected event from the 3500 feet horizon arrives 28.0 milliseconds later than it would have, if the drop distance between the source 41 and the detector station 42 had been zero. Thus, in the production of records from two field stations respectively disposed 2500 feet and 2000 feet from the master station, the events from the 3500 feet horizon will be shifted 43.3−28.0 or 15.3 milliseconds with respect to each other; which shift is altogether too large to accommodate effective integration. In order to compensate for this variation in accordance with the present method, the phase of each event is shifted before the recording thereof by an amount corresponding to the time difference that would have been involved if the drop distance between the source 41 and the detector station 42 had been some fixed distance. Without limiting the generality of the principles involved, let us here assume, for simplicity of illustration, that the phase of each recorded reflected event is so shifted that it is recorded at the same position on the recorder drum that it would have been recorded if the drop distance had been zero. Thus, when the drop distance of 2500 feet is involved, the event from the 3500 feet horizon is advanced on the recorder drum 43.3 milliseconds; and when the drop distance of 2000 feet is involved, the event from the 3500 feet horizon is advanced 28.0 milliseconds; whereby the two events are recorded at the time they would have been recorded, if the drop distance in the two cases had been zero, so that the two events from the 3500 feet horizon will be exactly in-phase and will integrate efficiently. However, this integration would apply only to the reflected events from the 3500 feet horizon. Accordingly, the advancement of the recording must be progressively varied so that at the time the event from the 3500 feet horizon is due to arrive at the detector station 42, the time of advancement is 43.3 milliseconds, and so that a short time later, and at the time the event from the 4000 feet horizon is due to arrive at the detector station 42, the time of advancement is only 38.0 milliseconds, and so that at a further short time later, and at the time the event from the 5000 feet horizon is due to arrive at the detector station 42, the time of advancement is only 30.8 milliseconds, etc., these figures being in accord with the calculated values of $\Delta t$ shown in the table. Thus, the advancement is progressively reduced as time proceeds so that with any given drop distance between the source 41 and the detector station 42 all of the reflected events from whatever depth involved will be recorded at exactly the time they would have been recorded, if the drop distance had been zero. Now by following this procedure at the different field stations 31, 32, etc., involving the different drop distances 2500', 2000', etc. with appropriate variation in the pattern of the time advancement of the recordings, in accordance with the different columns of the above table, like results may be obtained; whereby all corresponding reflected events are brought into phase coincidence in order to insure effective integration, regardless of the drop distances, and regardless of the depth of the reflecting horizons.

The arrangement for achieving this result will be understood by reference to Fig. 5, wherein the system includes an electron discharge tube 125 of the triode vacuum tube amplifier type that is provided with an anode, a cathode, and a control grid. The winding 105 of the device 93 and a battery source of plate current supply 126 are connected in series relation between the anode and the cathode of the tube 125; also a control grid biasing circuit is provided that includes a battery source of bias 127 and an associated voltage divider 128 connected in series relation to the cathode of the tube 125. The voltage divider 128 includes an adjustable wiper 129 that is connected via a grid leak resistor 130 to the control grid of the tube 125. Accordingly, the tube 125 is normally negatively biased and is operated within a range in which the plate current is substantially a linear function of the grid bias. Further, the circuit includes a charging capacitor 131 bridging the resistor 130 between the wiper 129 and the control grid of the tube 125, as well as a voltmeter 132 bridging the capacitor 131, the voltmeter 132 preferably being of the electronic type. Also, the circuit includes a relay 133 provided with two operating windings 134 and 135, as well as an armature, not shown, operable between first and second positions in response to energization of the respective windings 134 and 135, which armature controls the position of a main movable switch spring 136 operatively associated with two oppositely disposed stationary switch springs 137 and 138 of the locking type. More particularly, when the winding 134 is momentarily energized, the armature, not shown, operates the main switch spring 136 to engage the switch spring 137, whereby this engagement is preserved due to the locking action previously noted subsequent to the deenergization of the winding 134; and when the winding 135 is momentarily energized, the armature, not shown, operates the main switch spring 136 to engage the switch spring 138, whereby this engagement is preserved due to the locking action previously noted subsequent to the deenergization of the winding 135. The main switch spring 136 is connected to the control grid of the tube 125; the switch spring 137 is connected to the adjustable wiper 139 of an associated voltage divider 140; and the switch spring 138 is connected to one terminal of an associated adjustable resistor 141. The other terminal of the resistor 141 is connected to the wiper 129; and the voltage divider 140 is connected in series relation with an associated battery 142 to the wiper 129.

Also, the circuit network includes a manually operable switch 143 of the two-position type, operable from its normal position into a first position closing a first pair of contacts 144 and operable from its normal position into a second position closing a second pair of contacts 145. The winding 134, the contacts 144 and a battery 146 are arranged in series relation; and likewise, the winding 135, the contacts 145, the battery 146 and a switch 147 are arranged in series relation, the switch 147 also being operatively associated with the drum 65 and being selectively controlled by another cam 148 carried thereby.

In the arrangement, the voltmeter 132 is calibrated to read as a phase or time meter; the adjustable resistor 141 has a relatively high resistance and is employed as a grid leak resistor, as described more fully subsequently. By adjustment of the wiper 129, the initial bias applied to the control grid of the tube 125 may be established so as to establish the initial plate current thereof that traverses the winding 105 of the device 93. Moreover, the cam 148 closes the switch 147 at a particular angular position of the drum 65 and retains the same closed for a short time interval, thereafter opening the switch 147.

Referring now to Figs. 5 and 6 and considering the operation of this apparatus, the wiper 129 of the voltage divider 128 is first adjusted so that the plate current of the tube 125 traversing the winding 105 of the device 93 is such that the armature 96 thereof is held in its zero position, as indicated by the voltmeter 124. When the operator is ready to make a record, the manual switch 143 is momentarily operated to close the contacts 144, whereby the winding 134 of the relay 133 is momentarily energized so that the main spring 136 engages the spring 137, directly connecting the wiper 139 of the voltage divider 140 to the control grid of the tube 125 and effecting charging of the capacitor 131. More particularly, the capacitor 131 is quickly charged to the voltage set by the adjusted position of the wiper 139 of the voltage divider 140. The operator then adjusts the wiper 139 of the voltage divider 140, if required, so that the resulting negative bias applied to the control grid of the tube 125 from the wiper 129 of the voltage divider 128 is of proper amount in order that the plate current of the tube 135 traversing the winding 105 is sufficient to move the armature 96 of the device 93, and consequently the recording head 66, by an amount to give the desired initial phase shift that the operator requires.

For purpose of illustration, it may be assumed that the operator is preparing to drop the weight 52 at the field station disposed 2500 feet from the detector station. By consulting the above table, he will find that in order to bring the time of recording of the reflected wave from the 3500 feet horizon to the point on the record where it would be if the drop distance were zero, he must advance the phase by just 43.3 milliseconds. The adjustment of the wiper 139 to achieve this objective may be readily established by reference to the voltmeter 132, as this meter is preferably calibrated in terms of shift in milliseconds of the recording head 66 with respect to the drum 65. When this setting has been established effecting the desired 43.3 milliseconds advance, the weight 52 may be dropped. Now it will be appreciated that if the 43.3 milliseconds advance is maintained throughout the recording of the reflected events from all horizons deeper than 3500 feet, the reflected events from the deeper horizons will arrive prematurely. Accordingly, the advancements noted must be progressively reduced as the events from the deeper horizons are due to arrive at the detector, and these progressive advancements of the recordings should be in accordance with the corresponding column of the table noted, so that all reflected events from all horizons will appear on the record at the same point where they would have appeared, if the drop distance had been zero and no phase shift were necessary. By achieving this result for all drop distances, then the corresponding events on successive individual records will be exactly in-phase and will therefore integrate efficiently regardless of the drop distances involved, and regardless of the depths of the various reflecting horizons involved.

Assuming now that the weight 52 is to be dropped at a field station that is 2500 feet from the detector station, the operator first actuates the manual switch 143 to close the contacts 144 so as to energize the winding 134 of the relay 133 in order to cause the main spring 136 to engage the spring 137, bringing about charging of the condenser 131 in the manner previously explained; and it may be again assumed that the wiper 139 of the voltage divider 140 has been appropriately adjusted to cause the voltmeter 132 to read 43.3 milliseconds corresponding to the charge of the condenser 131, as previously noted. The operator then actuates the switch 143 to close the contacts 145 so as to prepare the circuit for energizing the winding 135 of the relay 133. Subsequently, the cam 148 carried by the drum 65 closes the switch 147 at the proper time in the revolution of the drum 65, whereby the winding 135 of the relay 133 is energized effecting movement of the main spring 136 to engage the spring 138; whereby the resistor 141 is bridged across the capacitor 131 so that the charge thereon bleeds off at a predetermined rate depending upon the capacity of the capacitor 131 and the resistance of the resistor 141. As the charge on the capacitor 131 is thus reduced as time proceeds the bias upon the control grid of the tube 125 is progressively increased so that the plate current traversing the winding 105 of the device 93 is correspondingly progressively decreased bringing about a progressive reduction in the advancement of the recording head 66 with respect to the drum 65.

More particularly, as previously indicated, in integrating the reflected events from all horizons, beginning at the 3500 foot depth, and the initial phase shift of 43.3 milliseconds, the cam 148 is so placed on the drum 65 that it actuates the switch 147 at about the time that the reflected event from the 3500 foot horizon is due to arrive at the master station. This gives the correct phase shift at the 3500 foot level. The time of cutting-in the resistor 141 is not particularly critical and can be determined in any case from approximately known velocity data for the area being explored; whereby the cam 148 requires only very infrequent adjustment, frequently remaining in the same position for weeks at a time in geophysical explorations. Thus the reflected event from the 3500 foot level is recorded at the proper time; and a short time later, 5.3 milliseconds later, the reflected event from the 4000 feet horizon is due. By this time, the voltage on the capacitor 131 will have been reduced, whereby the bias on the control grid of the tube 125 will have been increased, so that the plate current of the tube 125 traversing the winding 105 of the device 93 will be just sufficient to effect movement of the recording head 66 to the point where the phase shift will be 38.0 milliseconds, as required by the data in the above tabulation. It will be evident that if the character of the discharge curve of the capacitor 131 is to be suitable for the present purpose, the phase shift must automatically conform substantially to the figures in the above tabulation; whereby all of the reflected events coming from the various horizons at different depths will be recorded at substantially the times that they would have been recorded if the drop distance had been zero. This is accomplished by appropriate selection and adjustment of the resistance of the resistor 141.

After the production of the individual record at the master station resulting from the drop at the field station disposed 2500 feet from the detector station, the truck 50 is moved to another field station, for example, that one disposed 2000 feet from the detector station; and the above-described operation is repeated. In this case, however, the figures in the next column of the above tabulation should be employed in the initial setting of the wiper 139 of the voltage divider 140, but it is not ordinarily necessary to adjust the resistance of the resistor 141. However, the resistor 141 is made adjustable, as previously noted, so that when explorations are carried out in different areas involving large changes in velocity, appropriate adjustments can be made; such adjustment being readily made from calculations employing well-known data and physical laws. By following the procedure outlined above, any number of individual records may be subsequently integrated with high efficiency, while dispersing the field stations at which the drops are made over as wide a distance or area as may be necessary substantially to eliminate the horizontally traveling waves from the individual records; and this is true for virtually all depths of reflected horizons in which the geophysicist is interested.

These considerations are based upon the premise that the rate of discharging the capacitor 131 is substantially the rate required to produce the proper progressive changes in phase shift to compensate for the time changes shown in the above tabulation. Assuming the validity of this assumption, it has been shown that the values of $\Delta t$ in the tabulation were calculated from the Equation 3, wherein the shortest distance $x_2$ was 0. Moreover, it was assumed that the phase shift at the recording head 66 is substantially a linear function of the voltage impressed on the control grid of the tube 125 by virtue of the composite action of the voltage divider 128 and the capacitor 131. Realizing these effects, it is evident that the voltage on the grid, and therefore the correcting shift of the recording head 66, must be an exponential function of time due to the circumstance that the discharge of the capacitor 131 via the resistor 141 is such an exponential function of time. If the initial voltage impressed on the capacitor 131 is designated as "E," it follows that the voltage thereon, designated by "V," is related to the time "t," after the resistor 141 (, of resistance "R," in ohms,) is connected across the capacitor 131 (, of capacitance "C," in farads), by the following equation:

$$(4) \quad V = Ee^{-\frac{t}{RC}}$$

Since the phase shift $\Delta t_1$, at the recording head 66 is a linear function of "V," then it follows that this phase shift resulting from the use of this equipment is given by the equation:

$$(5) \quad \Delta t_1 = Ke^{-\frac{t}{RC}}$$

where "K" is a constant, and "e" is the natural log base.

To be sufficiently accurate for practical purposes the phase shift, as accomplished according to Equation 5 must be in close agreement with the required phase shift as determined from geometrical calculations, with due consideration of the velocity factor. The values of $\Delta t$ shown in the above table are calculated as a function of the depth of the reflecting horizon. In order to permit comparison with Equation 5 the $\Delta t$ values must be expressed as a function of time, time being taken as zero when the impact is generated, as for example, at stations 31, etc. This value of overall time T is given by Equation 6;

$$(6) \quad \Delta T = \sqrt{\frac{x^2 + 4h^2}{V}}$$

With this equation we can, by well-known procedures, convert the data of the above table from a function of depth to a function of time. This latter value of $\Delta t$ as a function of time is plotted as curve 149 of Fig. 8. This curve represents the actual phase corrections required to accomplish the objectives above outlined, while Equation 5 gives the corrections actually yielded by the devices hereinabove described. We now make a plot of the function represented by Equation 5, and by proper choice of constants that can be determined by well-known procedures we derive curve 150 of Fig. 8. The constants required to achieve this curve can readily be obtained by anyone skilled in electrical circuit calculations by assigning proper values to the initial voltage impressed on the capacitor 131, by rational design of the coil 105, a proper voltage of the battery 128 and a suitable rigidity of the spring 110.

From an inspection of the two curves 149 and 150 of Fig. 8, it may be observed that at no place does the corrective time-phase shift shown by curve 150 differ from the required time-phase shift shown by curve 149 by more than about 2 milliseconds. For 25 milliseconds wave length, this is less than 1/12 of a wave length or 30°; and it may be shown that any two sine waves that are superimposed with a phase angle if only 30° therebetween will integrate with an efficiency given by the cosine of 15°, which is 0.966; whereby the integration efficiency is 96.6%. By calculating the integration efficiency for other respective points over the entire depth range from 3500 feet to 12,000 feet, and a range of drop distance over the range from 0 to 2500 feet, which ranges embrace practically all conditions that are encountered in practice, it is found that the average integration efficiency is better than 98%, a highly satisfactory figure, and one that demonstrates that even wider ranges can be used successfully if desired in accordance with the present method. Similar calculations made for other drop distances, such as, 2000 feet or 1500 feet, give similar results, without changing any of the constants in the equation; which demonstrates that the successful application of the present principle is a matter of design, and that by following the procedure outlined above the design calculations can be made by one skilled in the electrical arts.

As pointed out above, the method hereinabove described for bringing all reflected events in proper phase position for efficient integration is adequate for use within certain limits. However, if we are interested in integrating events from horizons deeper or shallower than those hereinabove contemplated, the disparity between the two curves of Fig. 8 may become prohibitively large, especially in the case of shallower horizons. Further, there are times when it is desired to work with much shorter wave lengths than those postulated above, in which case the deviation from coincidence of the two curves of Fig. 8 will be too great. These more extreme conditions can readily be met by a further provision illustrated in Fig. 5. For this purpose there is connected in series with the variable resistance 141 a second resistance 150a which, during the earlier portion of the record, is short-circuited, as for example, by contacts 150b on a conducting bar 150c carried on the drum 65. The resistance 141 is then given a relatively low value such as to give the discharge curve 150d, as shown in Fig. 9. Thus during the earlier part of the record when the compensations required are relatively large and charging rapidly, the discharge curve is relatively steep. However, in the later part of the record when reflected events are coming from relatively deep horizons, the discharge curve should be relatively flat. By proper design the contacts 150b can be made to leave the conducting bar 150c at the proper time so that the resistance 150a is cut into the bleeder circuit, after which the rate of discharge of the condenser 131 is relatively slow, giving the compensating curve 150e of Fig. 9. It will readily be seen that by this procedure the actual compensation can be made to approach more closely the desired value over a much wider range than if only a single resistance 141 were used. This principle can be carried further by providing additional resistors that are cut into the circuit at the proper times, so that any desired degree of accuracy in the compensation achieved can be attained over any desired range of depth of reflecting horizons, and for any desired wave lengths.

There is a further important variable that must be compensated in order that efficient integration of successive records may be obtained; i. e, the variation in the total travel-time of the reflected waves due to what is called "weathering." This is best illustrated in Fig. 7; and it is noted that there will usually be found a zone or layer 151 near the earth surface 152 that, due to weathering influences and lack of compaction by overburden, is soft and characterized by poor wave transmission properties. In general, this weathered zone 151 exhibits a low velocity wave transmission characteristic with respect to the successive underlying formations 153, 154, etc. In this figure, the base of this weathered zone is shown by the irregular line 155 extending between the points 156 and 157, and the zone may show marked variations in thickness at different points. These variations in thickness of this low velocity layer 151 give rise to substantial variations in travel-time of the reflected waves 158. The principle of the method by which these variations are compensated will be understood, when it is appreciated that the path of the reflected waves 158 traveling from a source at a point 159 to a detector at a point 160 is refracted at the points 156 and 157 and reflected at a point 161, the points 156 and 157 lying at the boundary between the low velocity weathered zone 151 and the high velocity underlying formation 153. In accordance with well-known laws, the beam upon reaching the point 156 is re-radiated in all directions, one portion of the beam traveling directly from the point 156 to the point 157, as indicated by the path 162. It is a well-known fact that this refracted wave 162 traveling by the more direct path 159—156—157—160 will arrive at the detector at the point 160 at an earlier time than will the reflected wave 158 that travels by the more indirect route 159—156—161—157—160, involving the reflection at the point 161. It will be observed that this refracted ray 162 traverses the low velocity layer 151 by substantially the same two paths as does the reflected ray 158, whereby any deviations in travel-time of the reflected ray 158 caused by the low velocity surface zone 151 will occur also in the travel-time of the refracted wave 162. Since the refracted wave 162 arrives at the detector at the point 160 far ahead of the reflected wave 158, it is possible to detect and measure the variations from the normal travel-time to the actual travel-time of the refracted wave 162, and employ this variation as a basis for introducing an appropriate phase shift in the reflected wave 158. Specifically, the recording head 66 is shifted, as outlined above, in order substantially to correct for the variation mentioned.

Referring now more particularly to Figs. 4 and 5, the electrical contacts 75 incorporated in the impact switch 57 are disengaged at the instant of impact of the weight 52 upon the surface of the earth, whereby the seismic wave ensues in the manner previously explained. At the instant of impact, opening of the impact switch 57 interrupts the circuit for charging the capacitor 86, whereby the primary winding 87 of the transformer 88 is de-energized; and incident to the collapse of the magnetic field in the transformer 88, a voltage is induced in the secondary winding 89 thereof that is applied via a rectifying device 165 across a charging capacitor 166, the rectifying device 165 being a diode of the crystal type, such as, the selenium or copper oxide type. Also, the arrangement comprises an electron discharge device 167 of the triode vacuum tube amplifier type, that includes an anode, a cathode and a control grid, the capacitor 166 being bridged directly between the cathode and the control grid of the tube 167. A battery source of plate current supply 168 and the operating winding 169 of a relay 170 are connected in series relation between the anode and the cathode of the tube 167; and the tube 167 is provided with a control grid biasing circuit that includes a battery source of bias 171 and a series connected grid leak resistor 172, also connected across the capacitor 166. The relay 170 is further provided with a pair of contacts 173 that is included in series circuit relation with a charging capacitor 174, a source of battery voltage 175 and a resistor 176. Further, a voltmeter 177, preferably of the electronic type, is arranged in bridging relation with respect to the charging capacitor 174, the voltmeter 177 being calibrated in terms of milliseconds, as explained more fully hereinafter. Further, the circuit comprises a second relay 178 provided with an operating winding 179 controlling a pair of contacts 180 arranged in short-circuiting relation with the charging capacitor 166, the one of the contacts 180 connected to the cathode of the tube 167 being also connected to ground potential, as indicated at 181. The operating winding 179 of the relay 178 is connected to the output circuit of a pre-amplifier 182 having an input circuit that is connected via a cable 183 to an auxiliary detector 184 disposed adjacent to the main detector 42. In fact, the auxiliary detector 184 is really not essential, as the main detector station 42 may be connected commonly to the two pre-amplifiers 67 and 182 in parallel relation; however, as a matter of convenience in isolating the circuits, the arrangement of the auxiliary detector 184 adjacent to the main detector station 42 is recommended.

Considering now in greater detail the operation of the above-described portion of the circuit of Fig. 5, as previously indicated, when the impact switch 57 is operated into its open position, the capacitor 166 is charged by the voltage induced in the secondary winding 89 of the transformer 88, whereby the voltage across the capacitor 166 is impressed to reduce the normal negative bias applied to the control grid of the tube 167. Accordingly, the tube 167 is fired effecting energization of the winding 169 of the relay 170 and the consequent closure of the contacts 173, so that the capacitor 174 is charged through the resistor 176 from the battery 175. The voltmeter 177 is calibrated in terms of milliseconds and becomes a timing meter with respect to the charge upon the capacitor 174, the reading of the voltmeter 177 rising at a substantially uniform rate, as the capacitor 174 is charged with the passage of time.

Subsequently, when the seismic wave arrives at the master station, the detectors 42 and 184 are actuated, actuation of the auxiliary detector 184 bringing about energization of the winding 179 of the relay 178 by virtue of the connection including the cable 183 and the preamplifier 182, so that the relay 178 is operated to close its contacts 180. Closure of the contacts 180 brings about short-circuiting of the capacitor 166 so that the initial bias is returned upon the control grid of the tube 167, whereby the tube 167 is rendered non-conductive bringing about the deenergization of the winding 169 of the relay 170. Accordingly, the armature, not shown, of the relay 170 restores, effecting opening of the contacts 173, so that further charging of the capacitor 174 is arrested. Thus at this time the voltmeter 177 meters the total elapsed time between the opening of the impact switch 57, the instant of generation of the seismic wave, and the arrival of the first event at the detector station 42 and 184.

As previously explained, in conjunction with Fig. 7, the path of this refracted wave 162 through the low velocity weathered layer 151 is substantially the same as that of the reflected wave 158. Accordingly, a shift is introduced at the time of arrival of the reflected wave 158 that is exactly equal to the deviation from the normal time of the travel of the reflected wave 158, as indicated by the reading of the meter 177, so as to bring about compensation for the effects of the weathered layer 151. To accomplish this, the weight 52 is dropped at a new location and the reading of the meter 177 is noted, the meter 177 being so adjusted that when no voltage is impressed thereon it will take a considerable negative deflection, which may be accomplished by rotating the control spring of the arbor thereof by a proper amount. This adjustment comprises a fixed adjustment for exploration in any general locality so that the reading of the meter 177 should be "0" in the event there is no weathered layer in the vicinity of the exploration. The amount of this initial bias of the meter 177, expressed in milliseconds, should be equal to the distance between the points 156 and 157, in Fig. 7, divided by the velocity $V_{153}$, and for practical purposes, the distance therebetween may be taken as substantially the same as that between the points 159 and 160, or the distance between the field station involved and the detector station involved. The velocity $V_{153}$, if not known, can be readily measured, in a well-known manner, and once it is determined, the value of the initial bias of the meter 177 can be used over a wide area without serious or substantial error. With this initial negative bias of the meter 177, the reading thereof after any drop at the same distance, will be equal to the time in milliseconds for the reflected wave to travel through the low velocity weathered layer 151 at both ends of the path of travel, i. e., the time required for the wave to travel from the point 159 to the point 156, and also the time required for the wave to travel from the point 157 to the point 160.

In making use of this principle, the operator, upon moving to any new field in which a seismic exploration is to be made, first makes one drop at some standard drop distance between the master station and the field station, that has been adopted for this purpose, and notes the reading of the meter 177, which is in milliseconds, and comprises the deviation from the normal where no weathered layer exists. The operator may then adjust the screw 113 employing the rotary knob 114, in order to bring about adjustment of the position of the base 102 with respect to the support 103, in Fig. 6; whereby the recording head 66 is appropriately shifted with respect to the cooperating drum 65 by the amount indicated by the meter 177 and in a proper direction to compensate for the variation above noted. With this adjustment, all subsequent drops are made at the various field stations in the vicinity of the present seismic exploration; whereby the successive individual records will integrate with substantially the same efficiency as if no variable weathered layer existed.

When it is desired to integrate records from a plurality of field stations that vary considerably in surface elevation it will be necessary to compensate for the variation in time introduced because of the longer wave travel distance at the higher stations. Skilled geophysicists are familiar with converting elevation distances to equivalent time differences. When using the present invention the elevation of each field station is determined in advance and when this elevational distance is of such magnitude as to interfere with proper integration, then adjustment is made to compensate for these differences. When such a condition exists, the elevational differences are converted to differences of travel time and compensation for these times is made at each individual field station prior to dropping the weight. This compensation may be accomplished as in the above paragraph by adjusting the screw 113, to introduce the proper correction, or the compensation may be effected by proper variation of the voltage on capacitor 131, the effect of which has been explained heretofore. When a final composite record is made from the various individual records, it is ultimately made on photographic paper and a timing break is recorded for "zero" time, as well as timing lines across the record to facilitate counting of times, all of which are well known in the geophysical arts.

In view of the foregoing, it is apparent that there has been provided an improved method of seismic exploration, involving a detector station and a plurality of field stations arranged in a predetermined pattern, and a master station, wherein a plurality of sequential seismic shocks are produced at respective ones of the field stations, causing sequential seismic waves to ensue therefrom, the sequential seismic waves are individually detected at the detector station and corresponding individual records are produced therefrom, and a composite wave is produced from the individual record waves. In accordance with the method, the sequential seismic shocks are produced at the respective field stations by the sequential dropping of a given weight thereat upon the surface of the earth, the weight being carried to the different field stations upon a mobile vehicle, and the weight being dropped in each instance from a fixed height above the earth surface by dropping mechanism carried by the mobile vehicle. Also, in accordance with the method, the seismic waves are detected, and the electrical analogues are compensated, prior to the production of the individual records so as to insure efficient integration thereof in the subsequent production of the composite records. More specifically, the variation in the total travel-time of the seismic waves due to the passage thereof through the relatively shallow weathered layer of the earth adjacent to the surface thereof is initially compensated in the individual records; the variations in the total travel-times of the seismic waves due to the variations in the elevations of the different field stations with respect to that of the detector station are initially compensated in the individual records; the variable time intervals that are involved in the actual dropping of the weight at the various field stations, and that are caused by the varying surface elevations of the field stations, are individually compensated in the individual records; and the different components of each seismic wave resulting from the different reflective horizons disposed at progressively greater depths below the earth surface are progressively compensated in each individual record.

Also, there is disclosed an improved system for effecting the compensations named above, as well as improved apparatus for carrying into effect the compensations in the individual records, this apparatus involving a magnetic recording head that is operatively associated with an associated para-magnetic record medium, wherein the compensations mentioned are effected by appropriate shifting of the normal phase relationship between the recording head and the record medium. In the apparatus, the required phase shifts are accomplished prior to the recording of the electrical analogues of the seismic waves, so that the individual records are recorded upon the record medium in proper phase coincidence, in order to accomplish efficient integration of the individual records in the production of the composite records, so that the desirable characteristics of the individual records are greatly reinforced in the composite record and so that the undesirable characteristics of the individual records are greatly attenuated in the composite record.

It is apparent in the specification that there are in general two classes of time variables that require correction in order to achieve the prime objectives of this invention, the production of a plurality of records in which the time phase of corresponding desirable events of individual seismograms are recorded in sufficiently close time relationship so that such events will integrate efficiently and therefore be accentuated in the composite record while certain undesirable events will not integrate efficiently and will therefore be attenuated in the composite record. The first class of such time variables comprises; (1) all variations in the time elapsing between the sending out of a start signal, and the actual generation of the seismic wave; (2) variations in travel time in the weathered layer; and (3) variations in travel time due to varying elevation of successive stations. All of the time variations in this class are characterized by the fact that they are all independent of the depth of the reflecting horizons from which the desirable reflected events are derived. The second of these two classes of time variables embraces those variations in time of the reflected events that result from changes in distance between the point of origin of the seismic waves, and the point at which they are detected. These time variables are, as explained above, definitely related to the depths of the reflecting horizons.

The specification further shows that, in this invention, the time variations of the first class as above described are compensated for by means, either manual or automatic, that set up the necessary compensating conditions prior to the actual detection and recording of the seismic wave while these time variations of the second class are compensated for by means that set up the necessary compensating conditions simultaneously with the detection and recording of the seismic waves.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. The method of geophysical exploration involving a master station and a field station arranged in spaced-apart relation and employing record-production apparatus including a first element in the form of a recording device and a cooperating second element in the form of a record medium that have a variable positional relationship with respect to each other said method comprising transmitting at a first time a start signal from said master station to said field station, initiating in response to said start signal an action subsequently productive at a second time of an earth shock at said field station, the time interval of said action being subject to limited variation, transmitting at said second time a shock signal from said field station to said master station, imparting relative movement to said elements in accordance with the elapsed time interval between said first time and said second time so as to establish a corresponding positional relationship therebetween, detecting the seismic wave ensuing from said earth shock at said field station, and operating said recording device to record said detected seismic wave upon said record medium while said elements are in said established positional relationship.

2. The method set forth in claim 1, wherein said action consists essentially of dropping a weight upon the earth from a substantially fixed height thereabove so that said earth shock is produced as a result of the impact therebetween, and said start and shock signals are of electrical character requiring entirely inconsequential time intervals in the transmission thereof between said stations.

3. The method set forth in claim 1, wherein said recording device has a normal position with respect to said record medium corresponding to a normal elapsed time interval between said first time and said second time, and wherein the step of imparting relative movement to said elements involves advancing said recording device from its normal position in the direction of recording in the event said elapsed time interval named is shorter than said normal elapsed time interval and retracting said recording device from its normal position against the direction of recording in the event said elapsed time interval named is longer than said normal elapsed time interval.

4. The method set forth in claim 1, wherein said recording involves varying the magnetic character of a para-magnetic medium.

5. The method set forth in claim 1, wherein said recording involves imparting a substantially uniform motion to said record medium with respect to said recording device, and wherein the step of imparting relative movement to said elements involves moving said recording device with respect to said record medium.

6. The method of geophysical exploration involving a detector station and a field station arranged in spaced relation, and a master station having record-production apparatus including a recording device and a cooperating record medium having a variable positional relationship with respect to each other; said method comprising producing a plurality of sequential impacts upon the earth surface at said field stations so that corresponding seismic waves sequentially ensue therefrom, each of said seismic waves having a plurality of wave components that progressively arrive at said detector station and that are related mutually to the distance between said detector station and said field station and to the character of the relatively shallow weathered layer of the earth adjacent the earth surface and to the depth of major reflecting horizons disposed at considerable depth below the earth surface, measuring the portion representative of travel time through said weathered layer of the elapsed time interval between one of said impacts and the arrival at said detector station of the first to arrive component of the resulting seismic wave, setting in accordance with said measured portion of the elapsed time interval a corresponding positional relationship between said recording device and said record medium, detecting the wave components of the respective seismic waves at said detector station coincident with the arrival thereof at said detector station, and operating said record-production apparatus with said recording device and said record medium in said positional relationship to produce wave records of said detected components of said respective seismic waves whereby said components of the respective wave records are related to said components of said respective seismic waves by said set positional relationship.

7. The method of geophysical exploration involving a detector station and a field station arranged in spaced-apart relation, and a master station; said method comprising providing at said master station record-production apparatus including a recording device and a cooperating record medium that have a variable positional relationship with respect to each other, producing first and second sequential impacts upon the earth surface at said field station so that corresponding first and second seismic waves sequentially ensue therefrom, each of said seismic waves containing a plurality of components that progressively arrive at said detector station and that are related mutually to the distance between said detector station and said field station and to the character of the relatively shallow weathered layer of the earth adjacent to the earth surface and to the depth of a major reflecting horizon disposed at a considerable depth below the earth surface, measuring the elapsed time interval between said first impact and the arrival of said first seismic wave at said detector station as an evaluation of the character of said relatively shallow weathered layer of the earth, setting in accordance with said measured elapsed time interval a corresponding positional relationship between said recording device and said record medium, detecting the components of said second seismic wave at said detector station coincident with the arrival thereof at said detector station, and operating said apparatus with said recording device and said record medium in said set positional relationship to produce a corresponding wave record of said detected components of said second seismic wave coincident with the detection thereof, whereby said components of said record wave are related to said components of said second seismic wave by said set positional relationship named.

8. The method set forth in claim 7, wherein said recording involves varying the magnetic character of a paramagnetic medium.

9. The method set forth in claim 7, wherein said recording involves imparting a substantially uniform motion to said record medium with respect to said recording device, and wherein said setting of said positional relationship between said recording device and said record medium involves moving said recording device with respect to said record medium.

10. The method of geophysical exploration involving a detector station and a plurality of field stations arranged in mutually spaced-apart relation; said method comprising producing sequentially a corresponding plurality of impacts upon the earth surface at respective ones of said field stations so that a corresponding plurality of seismic waves sequentially ensue therefrom, each of said seismic waves containing a plurality of components that progressively arrive at said detector station and that are related mutually to the distance between said detector station and the particular field station involved and to the character of the relatively shallow weathered layer of the earth adjacent to the earth surface in the vicinity of said field stations and to the depth of a major reflecting horizon disposed at a considerable depth below the earth surface, measuring the elapsed time interval between a first impact at a first of said field stations and the arrival of the corresponding first seismic wave at said detector station as an evaluation of the character of said relatively shallow weathered layer of the earth in the vicinity of said field stations, establishing a time-phase shift figure from said measured elapsed time interval, detecting the components of the other of said seismic waves at said detecting station coincident with the arrival thereof at said detecting station, shifting the time-phase of said detected components of said other seismic waves coincident with the detection thereof by an amount corresponding to said established time-phase shift figure, recording said shifted components coincident with the shifting thereof to produce a plurality of individual wave records respectively corresponding to said other seismic waves, whereby the components of each of said individual wave records are related to the components of the corresponding ones of said other seismic waves by said established time-phase shift figure, whereby said individual records contain first substantially in-phase components representative of desirable data and second substantially out-of-phase components representative of undesirable data, and producing a composite record of said individual records so that said first components in said individual records are substantially reinforced in said composite record and so that said second components in said individual records are substantially attenuated in said composite record.

11. The method of geophysical exploration involving a detector station and a plurality of field stations arranged in mutually spaced-apart relation and disposed at different elevations; said method comprising determining the difference in elevation between said detector station and each of said field stations, establishing a corresponding plurality of time-phase shift figures from said corresponding determinations, sequentially producing a plurality of time-consuming actions at respective ones of said field stations that sequentially subject the earth thereat to a corresponding plurality of seismic shocks, detecting at said detector station the sequentially arriving seismic waves ensuing from said sequential seismic shocks, measuring the time-of-travel of one of said detected seismic waves, establishing from said last-mentioned measurement a fixed shift of the time-phase of the components of the other ones of said detected seismic waves, shifting in accordance with said established time-phase shift figures the time-phase of the components of the respective corresponding other ones of said detected seismic waves, also shifting in accordance with the time intervals of said time-consuming actions the time-phase of the components of the corresponding other ones of said detected seismic waves, also shifting in accordance with said fixed shift the time-phase of the components of the corresponding other ones of said detected seismic waves, also progressively shifting in accordance with the time-of-travel of the components of the corresponding other ones of said detected seismic waves the time-phase of the components of the corresponding other ones of said detected seismic waves, producing a plurality of individual wave records from the corresponding other ones of said detected seismic waves after said composite shifting of the time-phase of the components thereof, said individual wave records containing first substantially in-phase components representative of desirable data and second substantially out-of-phase components representative of undesirable data, and then producing a composite record of said individual records so that said first components in said individual records are substantially reinforced in said composite record and so that said second components in said individual records are substantially attenuated in said composite record.

12. In a geophysical exploration system including a master station and a field station arranged in spaced-apart relation; the combination comprising record-production apparatus including a recording device and a cooperating record medium that have a variable positional relationship with respect to each other, means for transmitting at a first time a start signal from said master station to said field station, means responsive to said start signal for initiating an action subsequently productive at a second time of an earth shock at said field station, the time interval of said action being subject to limited variation, means for transmitting at a second time a shock signal from said field station to said master station, means for measuring the elapsed time interval between said start signal and said shock signal, means controlled by said measuring means for selectively establishing a positional relationship between said recording device and said record medium, means for detecting the seismic wave ensuing from said earth shock at said field station, and means for operating said apparatus with said recording device and record medium in said established positional relationship to produce a record of said seismic wave.

13. The system combination set forth in claim 12, wherein said measuring means essentially comprises an electron-controlled device, and said means for selectively establishing a positional relationship between said recording device and said record medium essentially comprises an electro-dynamic device.

14. The system combination set forth in claim 12, wherein said recording device consists essentially of a magnetic recording head, and said record medium consists essentially of a paramagnetic medium.

15. The system combination set forth in claim 12, wherein said record-production apparatus also includes means for imparting substantially uniform motion to said record medium with respect to said recording device, and said means for selectively establishing a positional relationship between said recording device and said record medium essentially comprises means for selectively moving said recording device with respect to said record medium.

16. In a geophysical exploration system including a detector station and a field station arranged in spaced-apart relation; the combination comprising means for subjecting the earth to a seismic shock at said field station so as to cause a seismic wave containing a plurality of components respectively produced by a corresponding plurality of major reflecting horizons disposed at progressively increasing depths below the earth surface and arriving progressively at said detector station, the progressive arrival of said components of said seismic wave being related both to the distance between said detector station and said field station and to the respective depths below the earth surface of said major reflecting horizons, means for progressively detecting at said detector station said components of said seismic wave coincident with the arrival thereof at said detector station, recording means for recording said wave components, shifting means for progressively shifting the time-phase of said detected components comprising a capacitor, a cooperating electron-controlled device governed by the charge upon said capacitor and an electrodynamic device controlled by said electron-controlled device, and means for progressively operating said recording means coincident with the shifting of the time-phase of said wave components to produce a wave record, whereby said components of said record are related to said components of said seismic wave by said progressive shift that is effected subsequent to said detection and prior to said recording.

17. In a geophysical exploration system including a detector station and a field station arranged in spaced-apart relation, and a master station; the combination comprising means for subjecting the earth to a seismic shock at said field station so as to cause a seismic wave that subsequently arrives at said detector station, means for transmitting a shock signal from said field station to said master station at the instant of said seismic shock at said field station, a control device at said detector station operative in response to the arrival of said seismic wave at said detector station, a timer, means responsive to said shock signal for initiating operation of said timer, means responsive to operation of said control device for arresting operation of said timer, the time interval of operation of said timer serving as an evaluation of the character of the relatively shallow weathered layer of the earth adjacent to the earth surface, means for detecting at said detector station the components of said seismic wave arriving thereat, means for selectively shifting the time-phase of said detected components, said shifting means being selectively settable in accordance with the time interval of operation of said timer, and means for recording said shifted components to produce a wave record.

18. The system combination set forth in claim 17, wherein said timer essentially comprises a capacitor, means for progressively charging said capacitor during said time interval of operation of said timer, a cooperating electron-controlled device governed by the accumulated charge upon said capacitor, and a measuring instrument operated by said electron-controlled device.

References Cited in the file of this patent

UNITED STATES PATENTS

| | | |
|---|---|---|
| 2,018,737 | Owen | Oct. 29, 1935 |
| 2,088,588 | Dudley | Aug. 3, 1937 |
| 2,276,708 | Wyckoff | Mar. 17, 1942 |
| 2,376,195 | Scherbatskoy | May 15, 1945 |
| 2,394,990 | Eisler | Feb. 19, 1946 |
| 2,440,971 | Palmer | May 4, 1948 |
| 2,499,605 | Nicolson | Mar. 7, 1950 |
| 2,620,890 | Lee et al. | Dec. 9, 1952 |
| 2,638,402 | Lee | May 12, 1953 |